US007076450B1

(12) United States Patent
Lopez, Jr.

(10) Patent No.: US 7,076,450 B1
(45) Date of Patent: Jul. 11, 2006

(54) METHOD FOR AUTOMATED PRINT ORDERING UTILIZING THE INTERNET

(75) Inventor: Leonard H. Lopez, Jr., San Antonio, TX (US)

(73) Assignee: Lopez Printing, Inc., San Antonio, TX (US)

(*) Notice: Subject to any disclaimer, the term of this patent is extended or adjusted under 35 U.S.C. 154(b) by 569 days.

(21) Appl. No.: 09/825,734

(22) Filed: Apr. 4, 2001

Related U.S. Application Data

(63) Continuation-in-part of application No. 09/487,392, filed on Jan. 18, 2000.

(51) Int. Cl.
*G06F 17/60* (2006.01)

(52) U.S. Cl. .............................. 705/26; 705/27; 707/1; 707/10; 709/203; 709/218

(58) Field of Classification Search ............ 705/26–27, 705/8, 400; 700/100, 101
See application file for complete search history.

(56) References Cited

U.S. PATENT DOCUMENTS

| | | | |
|---|---|---|---|
| 5,276,788 A | | 1/1994 | Stapleton |
| 5,303,342 A | | 4/1994 | Edge |
| 5,327,265 A | | 7/1994 | McDonald |
| 5,406,475 A | * | 4/1995 | Kouchi et al. ........... 705/8 |
| 5,890,175 A | | 3/1999 | Wong et al. |
| 5,906,475 A | * | 5/1999 | Melane et al. ........ 415/214.1 |
| 5,918,214 A | * | 6/1999 | Perkowski ............. 705/27 |
| 5,964,156 A | * | 10/1999 | Smith et al. ........... 101/471 |
| 6,108,642 A | * | 8/2000 | Findley .............. 705/44 |
| 6,134,568 A | | 10/2000 | Tonkin |
| 6,330,542 B1 | * | 12/2001 | Sevcik et al. ........... 705/8 |
| 6,347,256 B1 | | 2/2002 | Smirnov et al. |
| 6,429,947 B1 | * | 8/2002 | Laverty et al. ........ 358/1.15 |
| 6,473,760 B1 | * | 10/2002 | Klatt et al. ........... 707/10 |

FOREIGN PATENT DOCUMENTS

| | | |
|---|---|---|
| EP | 0 814 425 A2 | 12/1997 |
| EP | 0 814 425 A3 | 12/1997 |
| EP | 0814425 A2 * | 12/1997 |
| WO | WO 98/04988 | 2/1998 |
| WO | WO 98/10356 | 3/1998 |
| WO | WO 98/04988 * | 5/1998 |
| WO | WO 98/10356 * | 12/1998 |
| WO | WO 99/63452 * | 9/1999 |
| WO | WO 99/63452 | 12/1999 |
| WO | WO 00/26810 | 5/2000 |
| WO | WO 00/26811 | 5/2000 |

(Continued)

OTHER PUBLICATIONS

URL Web site http://www.imagex.com, copyright 2000, 3 pages obtained on Jan. 18, 2000.*

(Continued)

*Primary Examiner*—Wynn W. Coggins
*Assistant Examiner*—Jaime E. Zurita
(74) *Attorney, Agent, or Firm*—Charles W. Hanor, P.C.

(57) ABSTRACT

An automated print order system for institutional business cards and stationery products generally comprises a requestor interface for entry of a distributed user's print order and a processor interface for fulfillment of the user's print order. The requestor interface is adapted to enable the user to select a company tailored product according to a predeterminable profile and the processor interface is adapted to directly generate a pre-press product automatically incorporating the predeterminable profile into the tailored product. The pre-press product of the preferred embodiment of the present invention comprises a direct-to-plate command set or a printing plate generated therefrom.

4 Claims, 21 Drawing Sheets

FOREIGN PATENT DOCUMENTS

WO     WO 00/26810    * 11/2000
WO     WO 00/26811    * 11/2000

OTHER PUBLICATIONS

URL Web site http://www.impresse.com, 2 pages obtained on Jan. 18, 2000.*

URL Web site http://www.printonthenet.com, 9 pages obtained on Jan. 18, 2000.*

U.S. Appl. No. 09/487,387 filed Jan. 18, 2000.

U.S. Appl. No. 09/487,392 filed Jan. 18, 2000.

World Wide Web location http://www.imagex.com (date unknown).

World Wide Web location http://www.impresse.com (date unknown).

World Wide Web location http://www.printonthenet.com (date unknown).

* cited by examiner

Create Your Profile

Stationary Information

- Name* (75)
- Title* (79)
- Address* (80)
- Telephone (76)

General Information

- Billing Code (77)
- Supervisor (78)
- Contact Phone
- Username*

[Save Profile]

*Figure 7*

Order Status
Username: Doe4321

| Order # | Status | Product | Type | Qty | Ordered | Ship |
|---|---|---|---|---|---|---|
| 1498 | Awaiting Purchaser Approval | Letterhead | Service Center | 3 | 01/01/2000 | Ground |
| 1495 | Awaiting Purchaser Approval | Envelopes | Regular #10 | 1 | 01/01/2000 | Over Night |
| 1473 | Awaiting Shipping | Letterhead | Corporate | 1 | 12/15/1999 | Ground |

*Figure 9*

Create Service Center Profile

104

Stationary Information

Center Name*  [                    ]

Center Number*  [                    ]

Address Line 1*  [                    ]

105

Address Line 2*  [                    ]

General Information

Billing Code*  [                    ]

106

Contact Name  [                    ]

Contact Phone  [                    ]

Stationary Logo*  [              ▼]

107

[ Save Profile ]

*Figure 13*

Batch Orders

| | | | |
|---|---|---|---|
| John K. Doe<br>Order: 1495<br>Billing: 1212-3434-5656<br>User: Doe4321 | Ordered:<br>01/01/2000<br>Approved:<br>01/06/2000<br>Per Item: 49.25<br>Total: $ 49.25 | Envelopes<br>Regular #10<br>1 Box(es)<br>Overnight | View User Profile<br>Modify Order<br>Remove Order — 127<br>Batch Order ——— 128<br>☐ — 127 |
| John K. Doe<br>Order: 1496<br>Billing: 1212-3434-5656<br>User: Doe4321 | Ordered:<br>01/01/2000<br>Approved:<br>01/07/2000<br>Per Item: 15.00<br>Total: $ 30.00 | Business Cards<br>Field<br>2 Box(es)<br>2nd Day | View User Profile<br>Modify Order<br>Remove Order<br>Batch Order<br>☐ |

— 126

Batch ID ▼ — 123

Batch Selected

METHOD FOR AUTOMATED PRINT ORDERING UTILIZING THE INTERNET

RELATED APPLICATION

This application is a continuation-in-part of co-pending U.S. patent application Ser. No. 09/487,392 filed Jan. 18, 2000. By this reference, the full disclosures, including the claims and drawings, of U.S. patent application Ser. No. 09/487,392 and Ser. No. 09/487,387 are incorporated herein as though each were now set forth in its respective entirety.

FIELD OF THE INVENTION

The present invention relates to the expedited production of print media. More particularly, the invention relates to an internet based print order system specifically adapted for use in efficiently and cost-effectively supplying business cards, stationery products and the like to institutional and conglomerate users.

BACKGROUND OF THE INVENTION

Charges for business cards, stationery products and the like constitute a significant portion of any commercial enterprise's cost of doing business. Due, in general, to the labor intensive nature of type-setting and, in particular, to the necessity to specifically tailor each product to a particular user's identity and/or office location, the actual printing costs associated with these items have traditionally far exceeded the costs associated with other print media. In addition, while smaller entities are more readily able to incorporate card and stationery ordering functions into other job functions, large institutional and conglomerate users often find that a significant number of personnel must be dedicated solely to the functions of order preparation, approval, submission, proofing, receiving, quality assurance and distribution. To further exacerbate the problem, each of these functions tends to be labor-intensive, each giving rise to the possibility for error, the only recourse being to reinitiate the entire process. Although such institutional and conglomerate users as are most affected by these problems have traditionally been expedient in rooting out similar problems in other areas of their businesses, they without exception tolerate these issues due to the generally accepted perception that no better system exists.

From the printer's perspective, the processes involved in receiving an order, typesetting a business card or stationery product and corresponding with the client to proof the order are typically more involved, and consequently often more costly, than the actual printing of the order. To further the frustration felt by the printer, the proofing process is ripe for dispute with the client, leading too often to the difficult decision as to whether to reprint an order free of charge or risk loss of the client by billing on a disputed order. What is more, even if the printer decides to discuss such an issue with its client, the regional printer must then at minimum absorb the long distance telephone charges involved in addition to those telecommunication charges already necessitated in faxing proofs and other related order documentation. Like the institutional and conglomerate users they serve, however, printers have consistently failed to address these issues, without exception accepting the present system as simply the best available.

Clearly, there is long-standing need for an improved print order system that eliminates these widely varied but unnecessarily cost-increasing functions. As a result, it is a primary object of the present invention to introduce an entirely new concept in business card and stationery ordering and printing for use by large institutional and conglomerate clients as well as the printers that serve their respective needs. In implementation of this concept, it is a further object of the present invention to provide an internet based print order system that minimizes data entry at the user site, streamlines the order approval process, eliminates the necessity for individual order proofing and eliminates data entry at the printer location. It is a still further object of the present invention to provide such as system that makes order status information automatically available for the user and incorporates the printer's billing functions directly into the order process. Likewise, it is a still further object of the present invention to facilitate drop-shipment of finished products by eliminating the need for user-side quality assurance and enabling orders to be processed according to destination address. Finally, it is an overriding object of the present invention to increase customer satisfaction by providing consistently accurate, fully company tailored business card and stationery products on a greatly reduced order processing timeline without sacrifice of control by the purchasing agent or of quality in the finished product.

SUMMARY OF THE INVENTION

In accordance with the foregoing objects, the present invention—a method for fulfillment of institutional business card and stationery product orders—generally comprises providing a specially adapted requestor interface for entry of a distributed user's print order and processing the user's print order through a likewise specially adapted processor interface. According to the preferred embodiment of the present invention, the requestor interface is adapted to enable the user to select a company tailored product according to a predeterminable profile and the processor interface is adapted to directly generate a pre-press product for automatically incorporating the predeterminable profile into the finished tailored product.

In particular, providing the requestor interface involves generating one or more prototypical product records, developing a list of fields according to the prototypical product record or records and defining a database management system. Each prototypical product record comprises a template sufficient to completely define the typography of a specific company tailored product, which will preferably include all tracking, kerning and text adjustment information for a specific product and may also include all necessary graphics placement information for the product. In the preferred embodiment of the present invention, this step involves generating a plurality of prototypical product records—one for each business card and/or stationery product style to be made available through the system.

Each field of the field list comprises a unique specification element for the various products. Among these elements, user-indicative information, such as name, private telephone line and/or e-mail address, as well as company indicative-information, such as local office address and authorized personnel title, will be collected and stored in a database management system. Once entered and stored, at least some of this type of information forms the predeterminable profile, enabling the remote user is to simply select the desired company tailored business card or stationery product without necessity for error-prone repetitive data entry.

The database management system comprises a user interface for input of data and selection of products, as well as other automated order approval and processing functions.

This interface is adapted for operation over the World Wide Web and, preferably, comprises a server-side scripting environment. As is known to those of ordinary skill in the art, such an environment is efficient in operation and also enables effective implementation of security protocols.

In processing of the print order, at least a portion of the data stored in the database management system is merged with the template of the appropriate prototypical product record to directly generate a pre-press product such as, for example, a direct-to-plate command set or a copier command set. According to the preferred embodiment of the present invention, however, a script, adapted to automatically format data for merging into the prototypical product records, is also generated during the production of the requestor interface and this script is so used during the order processing. Such a script also serves to automatically import graphics data into the templates according to the content of the data collected in the database management system during system setup and order entry.

Finally, many other features, objects and advantages of the present invention will be apparent to those of ordinary skill in the relevant arts, especially in light of the foregoing discussions and the following drawings, exemplary detailed description and appended claims.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein:

FIG. 7 shows, in a computer screen representation, certain details of the profile creation step of the product request entry function as detailed in FIG. 6;

FIG. 9 shows, in a computer screen representation, certain details of the order review step of the product request entry function as detailed in FIG. 6;

FIG. 13 shows, in a computer screen representation, certain details of the service center profile creation sub-step of the title or profile maintenance step as detailed in FIG. 12;

FIG. 19 shows, in a computer screen representation, certain details of the batch implementation sub-step detailed in FIG. 18.

DETAILED DESCRIPTION OF THE PREFERRED EMBODIMENT

Although those of ordinary skill in the art will readily recognize many alternative embodiments, especially in light of the illustrations provided herein, this detailed description is exemplary of the preferred embodiment of the present invention, the scope of which is limited only by the claims appended hereto.

Figure 1:
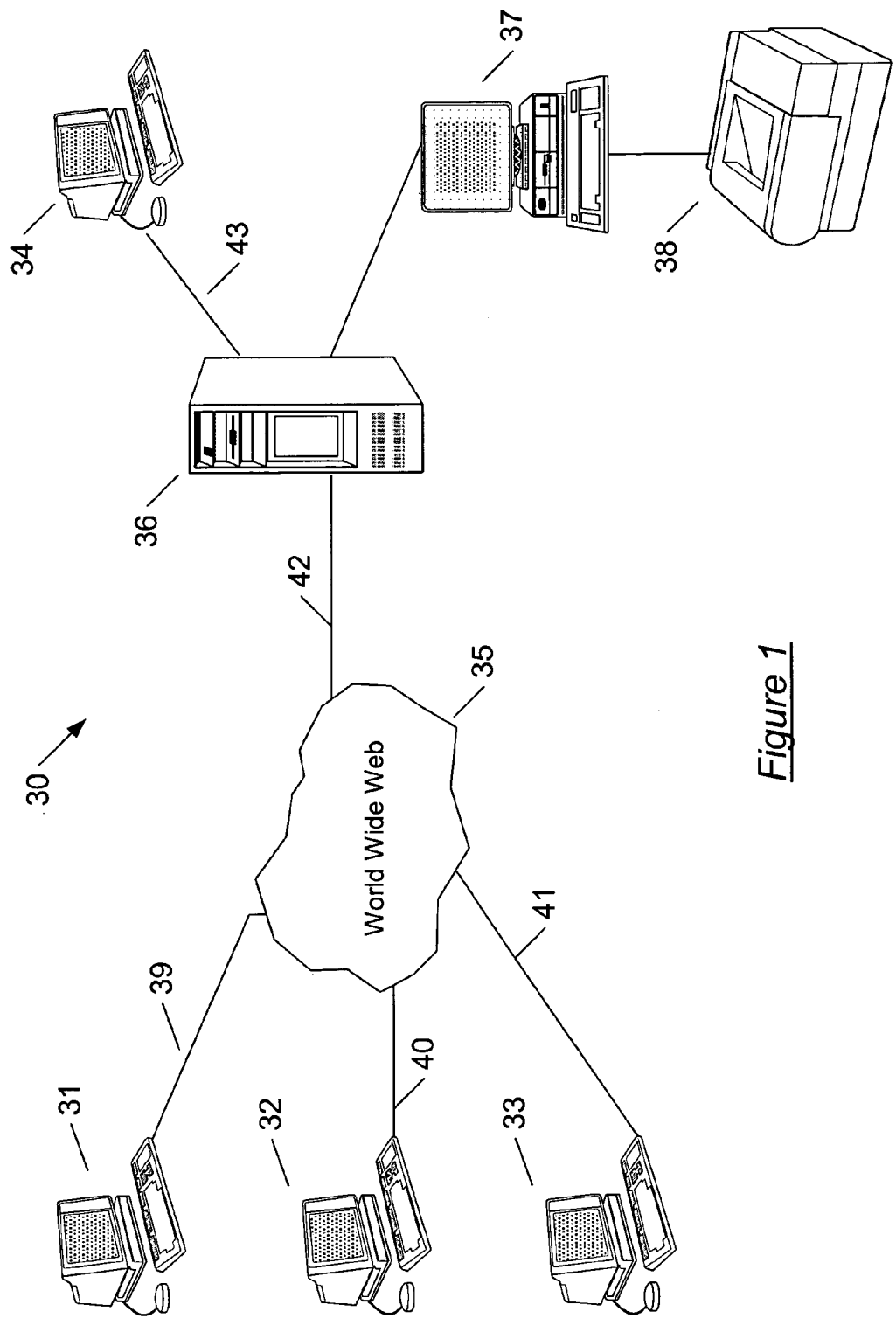
FIG. 1 shows, in functional block diagram, the internet based print order system of the present invention as implemented according to the presently preferred embodiment.

Referring now to FIG. 1 in particular, the Internet based print order system 30 of the present invention is shown to generally comprise one or more requestor interfaces 31, 32, a purchaser interface 33 and a processor interface 34, each resident upon the World Wide Web 35 through a host server 36. As also shown in FIG. 1, the print order system 30 of the present invention further comprises an interface 37 from the server 36 to an automated pre-press system 38 such as, for example, a direct-to-plate system. In operation, individual users and/or local office representatives access the server 36 through their respective ordinary Internet gateways 39, 40 in order to update user information and/or to place print orders. As will be better understood further herein, the updated information and/or print orders are then immediately accessible to a company purchasing representative, through the representative's ordinary Internet gateway 41, for order modification, deletion or approval. Likewise, approved print orders are then immediately accessible to the printer, through the printer's ordinary Internet gateway 42 or by direct access 43 to the server 36, as shown in FIG. 1, for any necessary processing prior to pre-press. Finally, approved and processed orders are directly flowed to the pre-press system 38, wherein a fully tailored print plate, or the substantial equivalent, is automatically produced to predetermined customer specifications.

Figure 2:
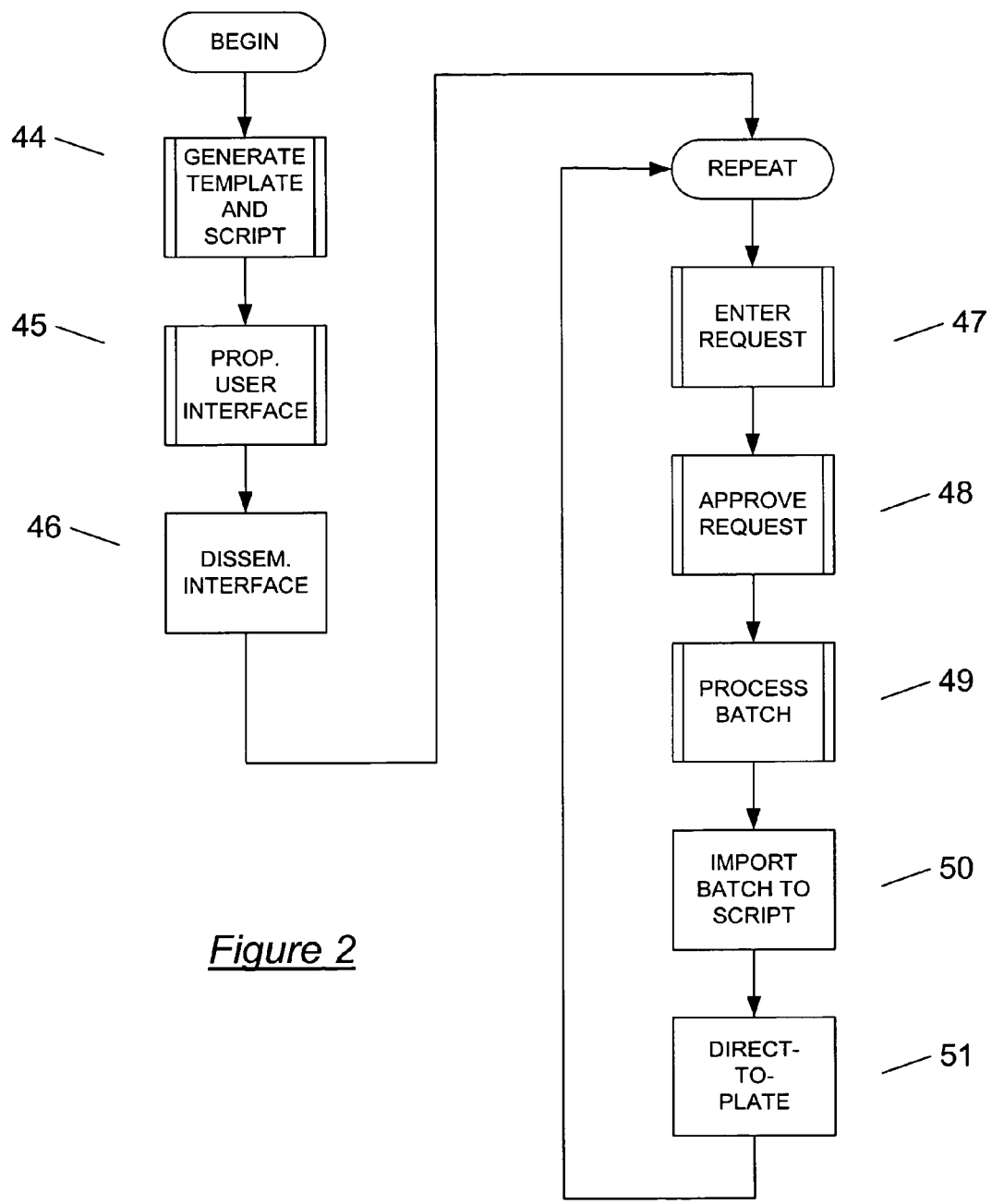
FIG. 2 shows, in flowchart, the top-level functions of the internet based print order system of FIG. 1.

As particularly shown in FIG. 2, the print order system 30 of the preferred embodiment of the present invention is generally implemented by generating per-product electronic publishing templates and a script program for automatically flowing order data thereto 44. As will be better understood further herein, the template and script program generation step 44 is also relied upon to generate a company specific field list, which is then used to construct a database management system 74, for collection and storage of user and print order information, and to propagate the requester, purchaser and processor interfaces thereto 45. Because the print order system 30 of the preferred embodiment of the present invention is designed for Internet implementation, the user interfaces are disseminated simply by e-mail message or like communication of the URL addresses corresponding to the interfaces' location on the World Wide Web 46.

Once the database management system and the requester, purchaser and processor interfaces thereto are established on the host server, business card and stationery print orders may be repetitively fulfilled through an efficient process of simplified order entry 47 and approval 48 followed by batch processing 49 and scripting 50 for the automated and accurate generation of print plates 51. As will be better understood further herein, the order entry step 47 generally comprises the single entry of user specific information followed by the repeated mere selection, from a full range of available products, of desired print products. As will be appreciated by those of ordinary skill in the art, this architecture dramatically reduces errors in order fulfillment by virtually eliminating the typesetting function. As also detailed further herein, the order approval process 48 is greatly streamlined by enabling the company's purchasing agent to rely upon the unchanged status of previously checked user entered information as well as his or her confidence in the automated fulfillment of an approved order. Finally, no typesetting and no proofing is required of the printer as the approved order information is directly and automatically flowed into the pre-press product 51.

Figure 3:
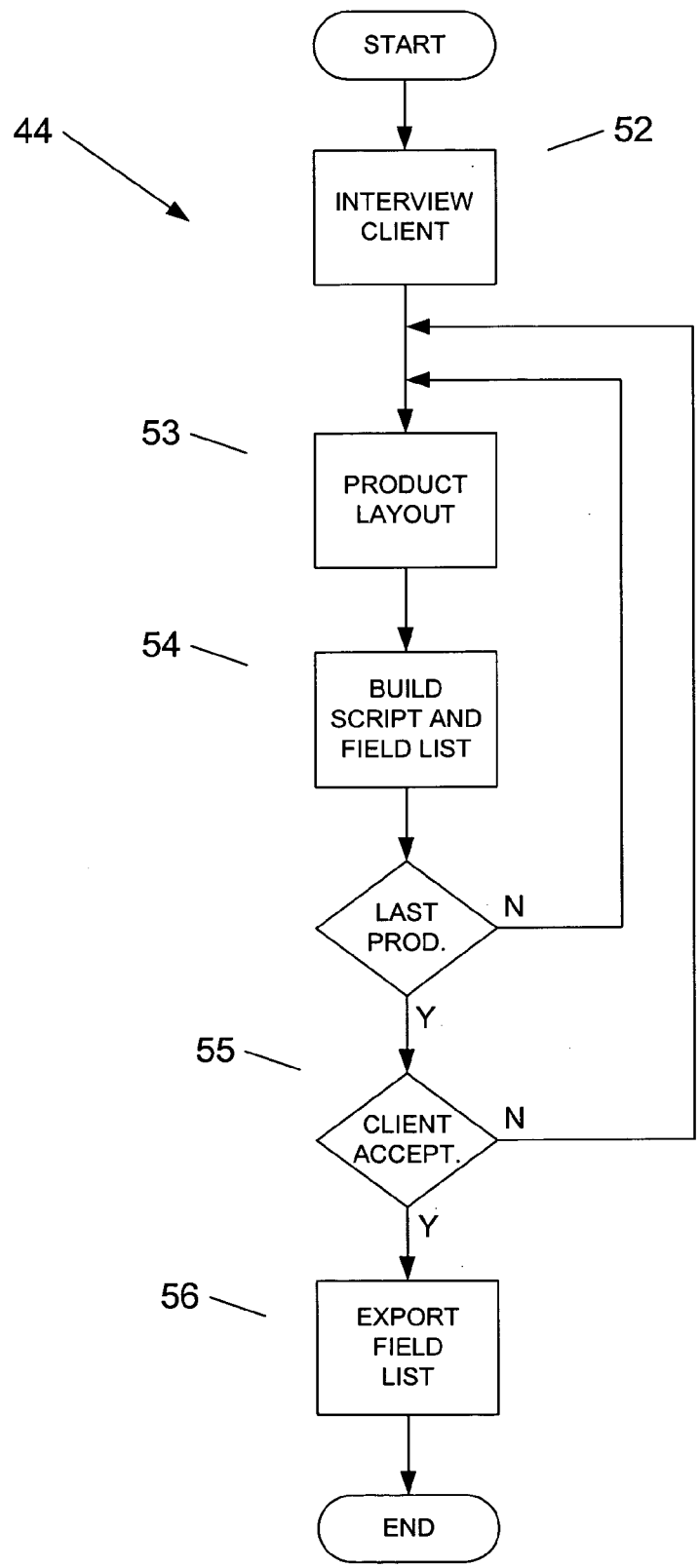
FIG. 3 shows, in flowchart, certain details of the template and script generation function of FIG. 2.

Referring now to FIG. 3, the template and script program generation function 44 is detailed. As a preliminary step, a printer representative will typically conduct an in-depth interview with the company client to determine the company's full range of business card and stationery needs 52. This interview will also determine the circumstances dictating when the various options are to be made available to each level of personnel. Samples of presently utilized business card and stationery products may also be collected at this time in order to ensure maximum product continuity upon implementation of the system. The printer's electronic publishing staff then generates a prototypical product record for each product to be made available through the system 53. This record, or template, comprises the complete typography of each product, including all tracking, kerning, text adjustment, graphics placement and like information. As will be better understood further herein, the prototypical records should be generated in a software directly compatible with the pre-press product to be used in fulfillment of the customer's print orders—in the preferred embodiment, a direct-to-plate platemaking system such as the well-known DPX system commercially available from Purup-Eskofot of Denmark. Although those of ordinary skill in the art will recognize many substantial equivalents, especially in light of this exemplary description, Applicant has found that the trademark "QUARK XPRESS" electronic publishing application, commercially available from Quark, Inc. of Denver, Colo., is one such suitable software.

As each possible product configuration is captured in a prototypical product record, a script program and field list is generated 54 as what will become an automated interface with a database management system 74, detailed further herein. This list essentially defines the fields for the database tables, each field representing a unique element of the various products' specification. For example, and in every case depending upon product layouts, one or more fields may be dedicated for the individual user's name, a field may be dedicated for the user's direct telephone line, a field may be dedicated for the user's e-mail address and so forth. As will be better understood further herein, user peculiar information of this nature is referred to as user-indicative information and the fields that contain such information will be utilized to create one or more predeterminable profiles in the database creation steps, detailed further herein. Likewise, one or more fields may be dedicated for company-indicative information such as, for example, the address of a particular local office or the list of authorized, standard titles for various personnel.

Although those of ordinary skill in the art will recognize that the data from a database created according to these fields could be flowed directly to the electronic publishing application for merger with the prototypical product records, it is preferred that a script program be generated 54 to handle formatting and graphics importation as an intermediate, albeit fully automated, process. The provision of such a script program ensures that the business cards and/or stationery products will invariably be produced according to company specification regardless of font type or size, and the like, utilized in filling the database tables. In the preferred embodiment of the present invention, Applicant has implemented such a script program with the trademark "XDATA" extension to the Quark product, commercially available from Em Software, Inc. of Steubenville, Ohio. Although those of ordinary skill in the art will recognize many substantial equivalents, the "XDATA" product is widely compatible with many standard database and spreadsheet applications and is specifically adapted for compatibility with the implemented trademark "QUARK XPRESS" application.

Figure 4:
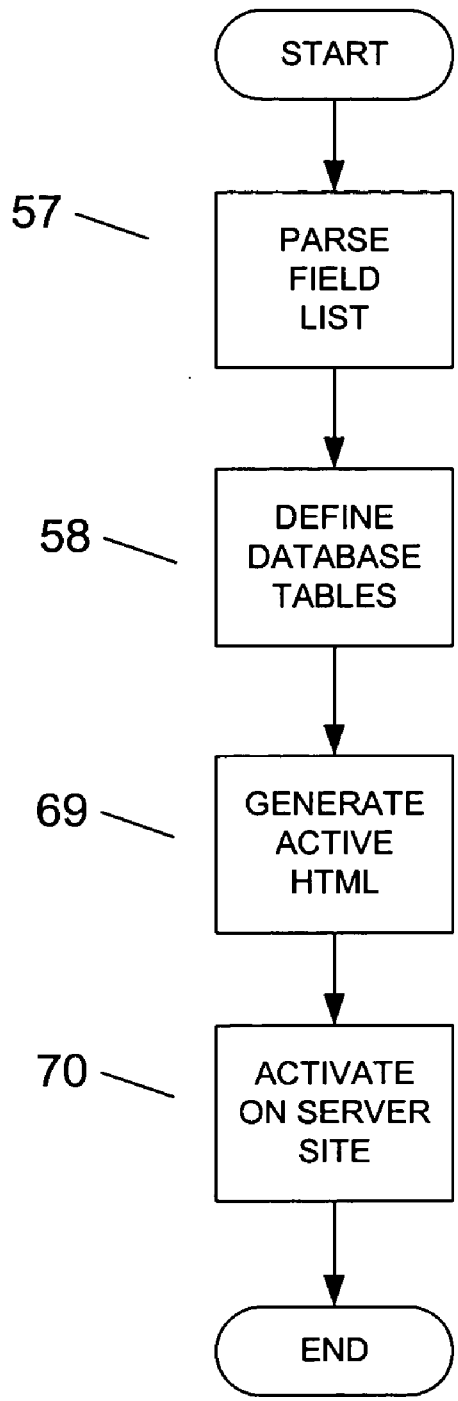
FIG. 4 shows, in flowchart, certain details of the user interface propagation function of FIG. 2.

Once a template has been produced for each product to be made available through the system and the fields necessary for completion thereof have been identified, demonstrative data may be flowed to the electronic publishing package to actually generate a print plate for quality assurance purposes 55. As will be better understood further herein, this is the only instance of proofing required according to the method of the present invention. If the product is correct at this juncture, the product will be correct in all cases save an error in filling the database. As also will be better understood further herein, however, the print order system of the present invention is also specifically adapted to root out any such database error. Assuming then client acceptance of the products produced according to the generated templates and scripting program, the field list is exported for database implementation 56, as detailed in FIG. 4.

Figure 5:
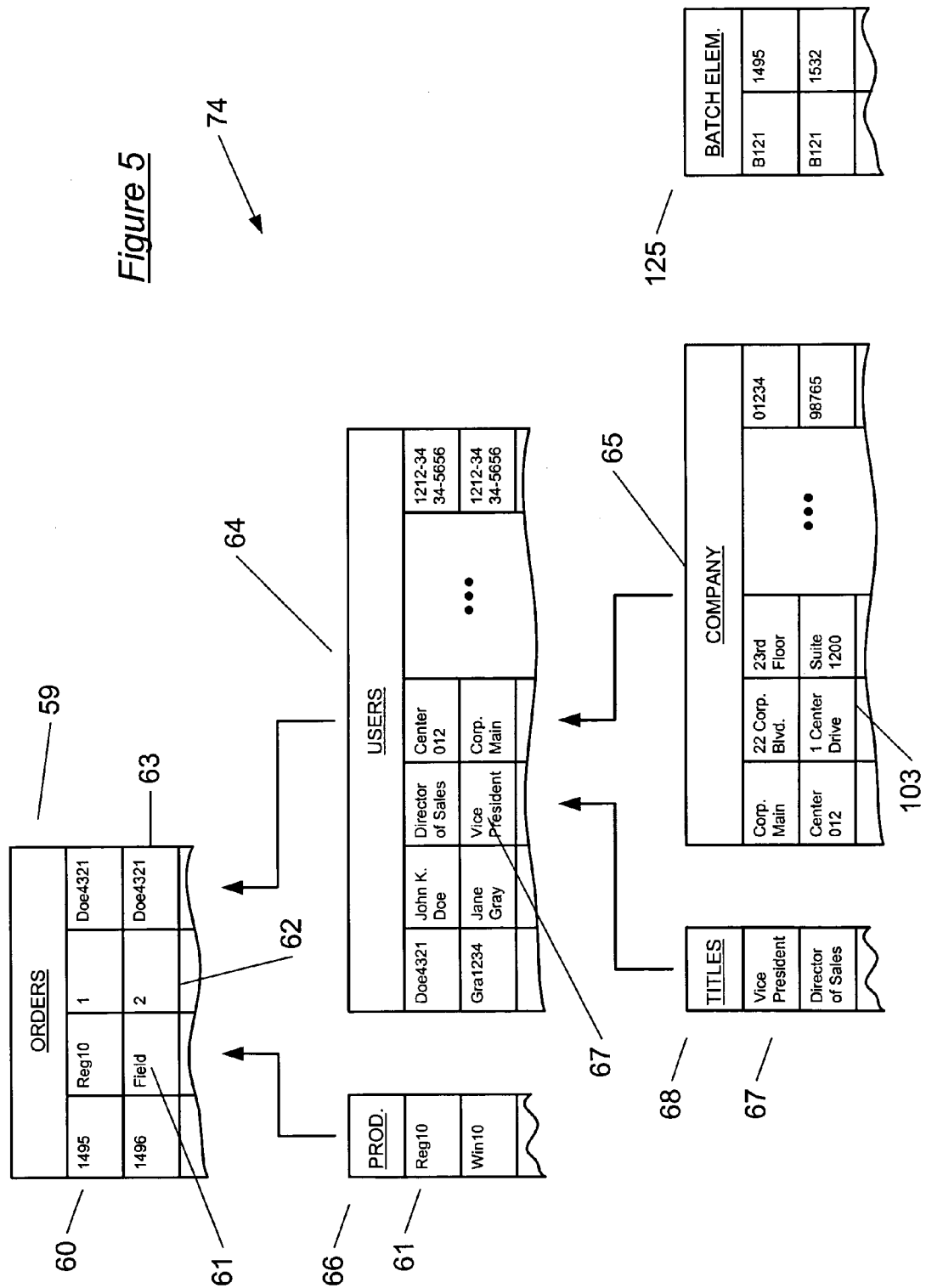
FIG. 5 shows, in schematic block diagram, certain details of the database structure of the internet based print order system of FIG. 1 as referred to in FIG. 4 and elsewhere.

As an initial step, the fields are parsed according to the type of information to be collected and held therein and, as will be better understood further herein, the circumstances under which that type of information may change over the implementation life of the print order system 57. Each category is then implemented in the database 74 as a separate, cross-linkable table 58. For example, as shown in the exemplary representation of FIG. 5, the "orders" table 59 may only contain an order number 60, product identifier 61, quantity 62 and user identifier 63. While the product identifier 61 and quantity information 62 are directly stored in the "orders" table 59, it is noted that the user information is actually only a cross-link to the "users" table 64. In this manner, as will be better understood further herein, an update to a user's information may be effective at the last possible moment prior to actual product printing. Likewise, company-indicative information is cross-linked from the "company" table 65 to ensure that a single update can be made effective on a date certain within all outstanding orders. As also shown in FIG. 5, product identifiers 61, stored in the "products" table 66 and authorized titles 67, stored in the "titles" table 68, are flowed into the various other tables as selectable only inputs. In this manner, only those products for which a prototypical record have been developed and only those titles authorized by the company can be selected by a user requestor.

The preferred embodiment of the present invention is implemented as a single database, wherein various fields may be automatically expanded as required for initial setup of a new company client or for making option changes for existing clients. Preferably, access by the printer for this function is handled through an intermediary program designed for this purpose. Because the system of the present invention is based upon a relational database structure, however, those of ordinary skill in the art will recognize that it is important for the intermediary program to implement certain rules to ensure the maintenance of a meaningful database. For example, the intermediary program should not allow a location to be specified for a company that does not exist in the program database. In addition to company setup, the intermediary program is also utilized to invoke various options for a company client. For example, as will be better understood further herein, certain company clients may desire that all orders be previewed prior to approval. This option is made mandatory by so indicating, through the intermediary program, in the program database.

Once the database tables are defined 58, according to the foregoing considerations, HTML interfaces are generated for database manipulation and maintenance 69. The system is then activated on the host server 70. In the preferred embodiment of the present invention, the HTML interfaces are implemented using a server-side scripting language, such as the trademark "ACTIVE SERVER PAGES," commercially available from the Microsoft Corporation of Redmond, Wash. In this manner, communications with the server from a user's browser are made extremely efficient, ultimately resulting in increased customer satisfaction. As is well known to those of ordinary skill in the art, such an implementation also enables the provision of effective security protocols. In any case, as shown in FIGS. 6 through 19, the implemented database interfaces 31, 32, 33, 34 of the present invention enable efficient order entry and approval and streamlined order fulfillment and exemplary features of the preferred embodiment are now detailed.

Figure 6:
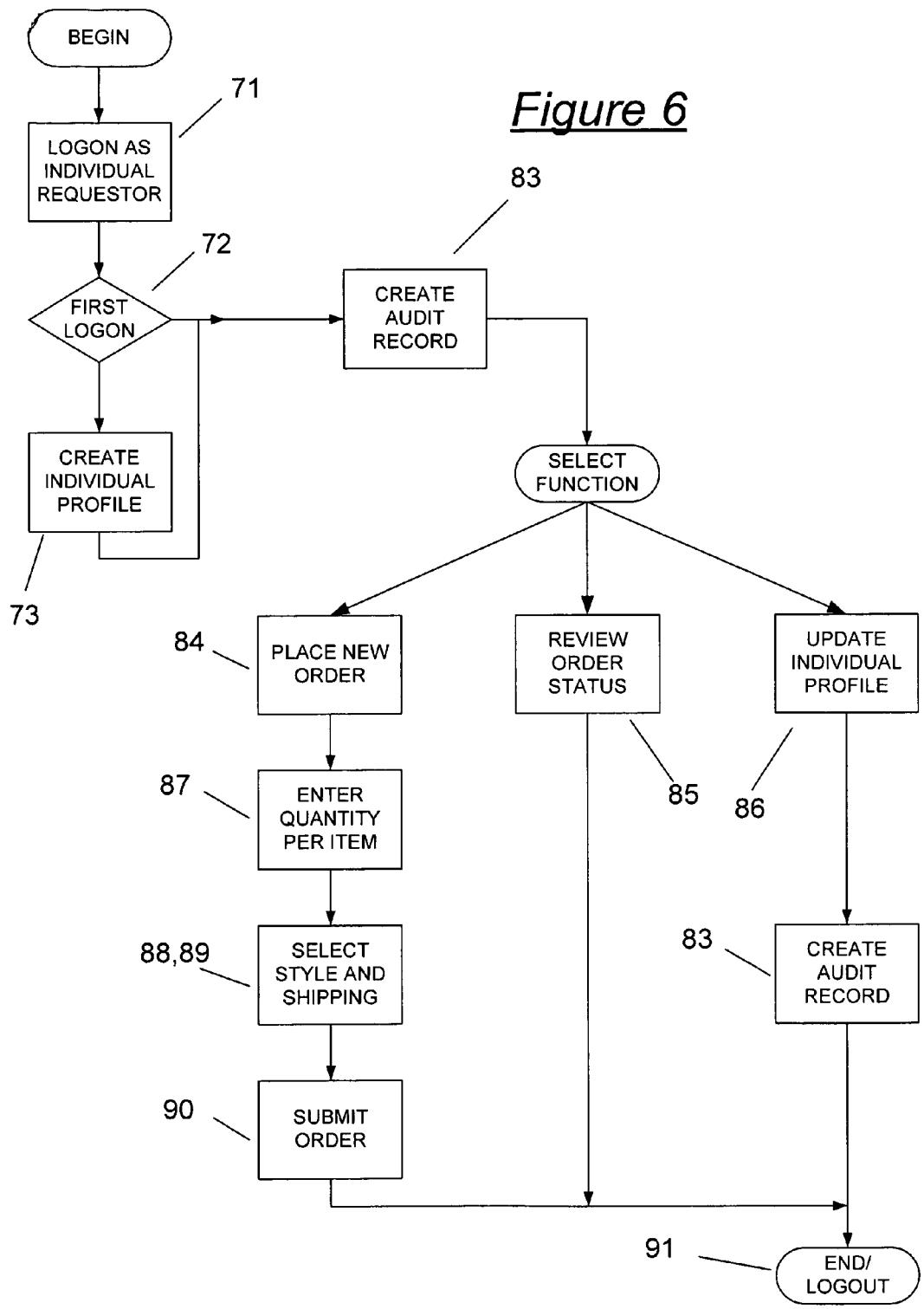
FIG. 6 shows, in flowchart, certain details, from an individual requestor's perspective, of the product request entry function of FIG. 2.
Figure 8:
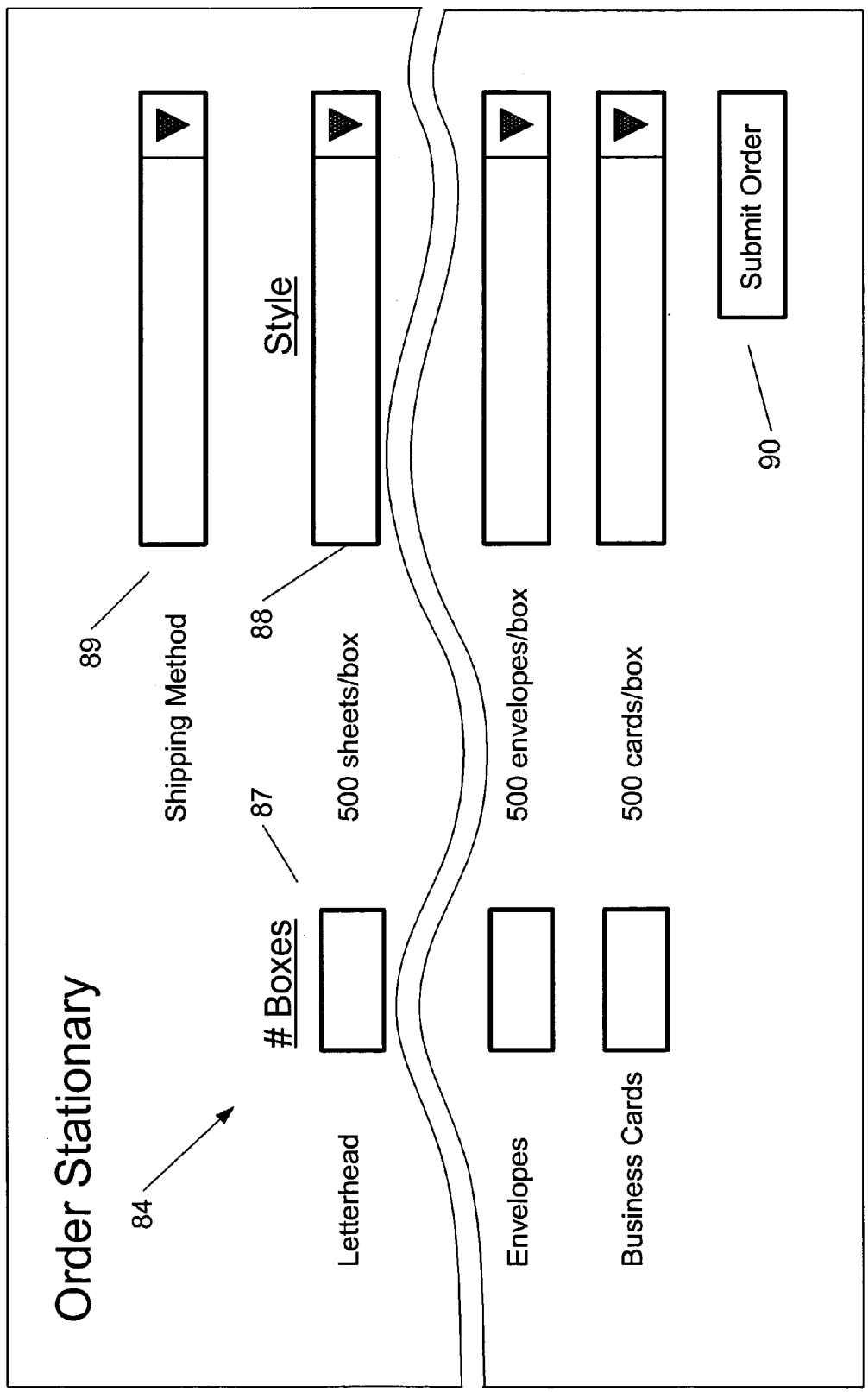
FIG. 8 shows, in a computer screen representation, certain details of the order placement steps of the product request entry function as detailed in FIG. 6.
Figure 21:
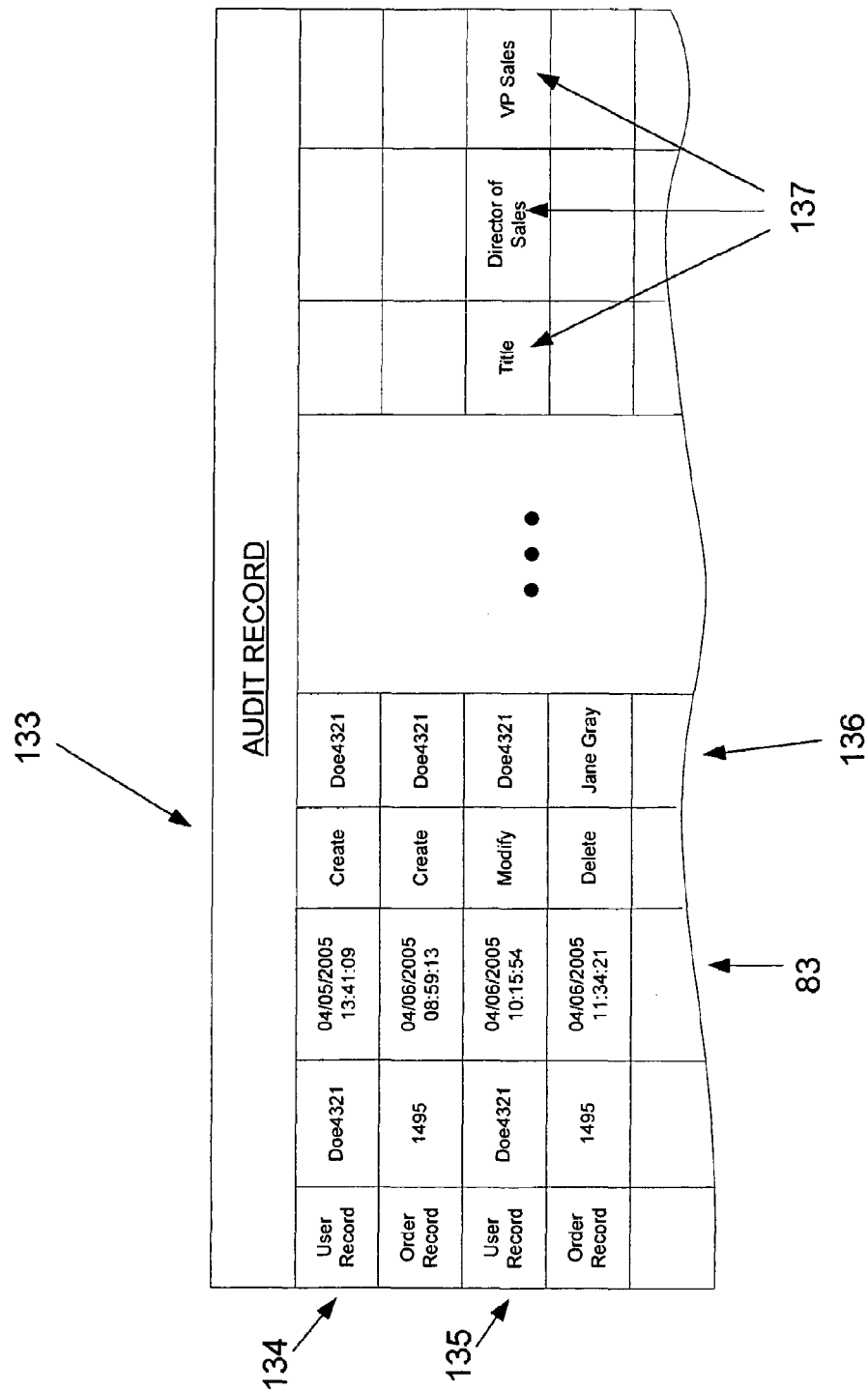
FIG. 21 is a representation of an audit record, which allows the tracking of additions and changes made by the company client.

Referring now to FIG. 6, the many of the functions available to the individual user print product requester are detailed. As shown in the Figure, a security protocol is implemented 71 to identify the individual user and, if the user has not previously utilized the system 72, he or she will be invited to create an individual profile 73. This profile, which will store all user-indicative information necessary to produce any available business card or stationery product, is then stored on the server 36 in the database management system 74. As shown in FIG. 7, such a profile 73 may include personal information such as the individual's name 75 and telephone number 76, and may also include, at the company's discretion, such information as a billing code 77 and/or supervisor name 78. It is noted that information such as the user's title 79 and address 80 are selected from drop-down menus 81, 82, thereby ensuring company control of authorized titles and address format, as will be better understood further herein. Finally, upon saving of the profile 73, a "last updated" date 83 is noted for communication to the company purchasing agent. In this manner, the company purchasing agent need only verify user input data upon change of that data. Additionally, referring to FIG. 21, a record 133 of the profile addition 134 or change 135, minimally including the date and time 83 of the addition or change and the name or other identifier 136 of the person making the addition or change, is preferably maintained. The resulting audit record may then be referred to as an effective means for minimizing or avoiding dispute between the printer and the company client. Although those of ordinary skill in the art will recognize that it is undesirable to store excessive audit data, details of the changed data may be desired in resolution of a disputed order. For this reason, it may be desired to maintain records of the changed data 137 in which case the audit data is preferably exported from the server to tape backup or the like in order to avoid excessive database growth.

Referring again to FIG. 6, it is noted that the individual user then has the options to place a new order 84, review the status of a pending order 85 or to update his or her profile 86, as necessary. As also shown in the exemplary order screen of FIG. 8, the user places a new order by simply entering the desired quantity per product 87 on the order form and then selecting the style 88 and shipping method 89. In this manner, the likelihood for error in the ordering process is virtually eliminated. As an additional check on the order, however, the preferred embodiment of the present invention also includes a preview function. Although those of ordinary skill in the art will recognize that many substantial equivalents, such as HTML, may be utilized, Applicant has found it desirable to implement the preview function using the tradename "PDF EXPRESS" plug-in commercially available from Think121, Inc. of Harwick, Pa., which results in exceptionally accurate representations of the finished product. Preferably, previews of any ordered product may be accessed at any point in the print fulfillment process. As will be better understood further herein, however, previews may also be made mandatory in certain instances. In any case, once the product selection is made, the submit order button 90 is simply clicked, reducing the entire business card and stationery product order process to an easy, error-free few seconds. The user may then be automatically logged out of the requestor interface 91.

It is noted that a primary object of the present invention is the streamlined fulfillment of institutional business card and print product orders. As part of this streamlined fulfillment, data entry is reduced to that which is necessary for the fulfillment of the customer's order. In particular, once a user has entered information to the system, neither the company purchasing agent nor the printer will reenter the same information save to correct a user's error. For this reason, while it is important that the customer be given maximum flexibility for dealing with the printer, it is critical that every safeguard be implemented protecting the company client and printer alike against loss from user input errors. In support of this twin aim, Applicant has, in an enhanced embodiment of the present invention, devised a hierarchical system wherein various responsibilities in the ordering process may be distributed to appropriate levels of supervision. Additionally, this hierarchy enables the setting of limits strategically designed to identify ordering errors, thereby providing maximum opportunity for correction prior to the actual printing of product.

Although those of ordinary skill in the art will recognize that more or less levels may be enabled, Applicant has found it suitable for service of a broad range of company clients to implement a five level hierarchy of users. According to this hierarchy, the Gatekeeper is given full authority over a company's print ordering function, including the ability to generate reports and manage any subordinate function. For very large organizations, a Region Agent is given similar authority extending to locations assigned by the Gatekeeper. A Location Agent acts as an intermediary authority between the Gatekeeper or Region Agent and lower levels of authority. For large locations, a Department Agent may be implemented to be responsible for management of portions of a particular location as determined by the Location Agent. Finally, the individual user or Employee is given responsibility over his or her own profile and allowed to enter orders as he or she may require. While those of ordinary skill in the art will recognize that the described system, which may be invoked in whole or in part depending upon a particular company client's needs, gives maximum flexibility for division of responsibility, it also produces a unique opportunity for the printer to implement various safeguards against erroneous or malicious orders.

The preferred embodiment of the present invention comprises a system of ordering limits, which are vary according to level in the system and product being ordered. For example, a user at the Employee level may desire to order a box of 500 business cards and erroneously specify 500 boxes rather than one box of 500. In the preferred embodiment of the present invention, this entry would exceed the limit for an Employee level user, at which time the order would be rejected and the employee prompted to reenter the quantity. Likewise, an Employee level user may be limited to a small quantity of stationery whereas a Region Agent level user may be authorized to order a much greater quantity. The dollar value of an individual order or aggregation of orders may also be limited. In this manner, the company is protected against erroneous or malicious orders or may utilize the limits as part of its budget control process. In addition, however, the printer also benefits from such a system by ensuring that orders do not exceed predetermined credit limits. While the previously described hierarchy is primarily intended for the mutual protection of the company client and the printer, those of ordinary skill in the art will recognize that a relatively simple extension may be implemented to facilitate a company's budget control process. In particular, order information may be accumulated as fulfilled over set periods of time, such as monthly or quarterly, and reported to the company client at the Gatekeeper or other appropriate level. While not necessary for print order fulfillment, such an extension may be desirable as a means for encouraging company clients to confidently automate their print ordering process.

A user having already placed an order may also desire to know the status of that order. In this case, the user is directed to an order status screen 85, such as the exemplary screen represented in FIG. 9, where the precise status of the order is made available without necessity for any human resources. As shown in the representation, the user can tell whether the company purchasing agent has approved the order 92 as well as whether the agent has changed any portion, such as quantity 87 or shipping method 89, of the order. Likewise, if there is any delay in the order fulfillment process, the user will also have accurate information as to whether the delay is a printer problem or a delay in the approval process.

In order to facilitate the provision of status information, the preferred embodiment of the present invention also includes a system of tracking orders as they are printed, packaged and shipped. In particular, a job control sheet, which is prepared and printed with the print plate, is preferably provided with a bar code that may be read as the product passes from station to station on the printer's production floor. Because the scanned location information may be directly stored on the system server, the user requesting status information is ensured of the latest and most accurate data. Additionally, because the present invention also contemplates management of the order shipping process, the user may utilize the status function to be automatically directed to a common carrier's Internet site for tracking information for shipped orders.

As a further extension of this aspect of the present invention, it is noted that in at least one embodiment orders are automatically sorted for printing according to shipping address. In this case, the bar code for status may be printed on a mailing label for use in shipping of the finished product. Because the printer will have available data regarding product weight postage rates, it is noted that this mailing label may also included computer generated postage.

Figure 10:
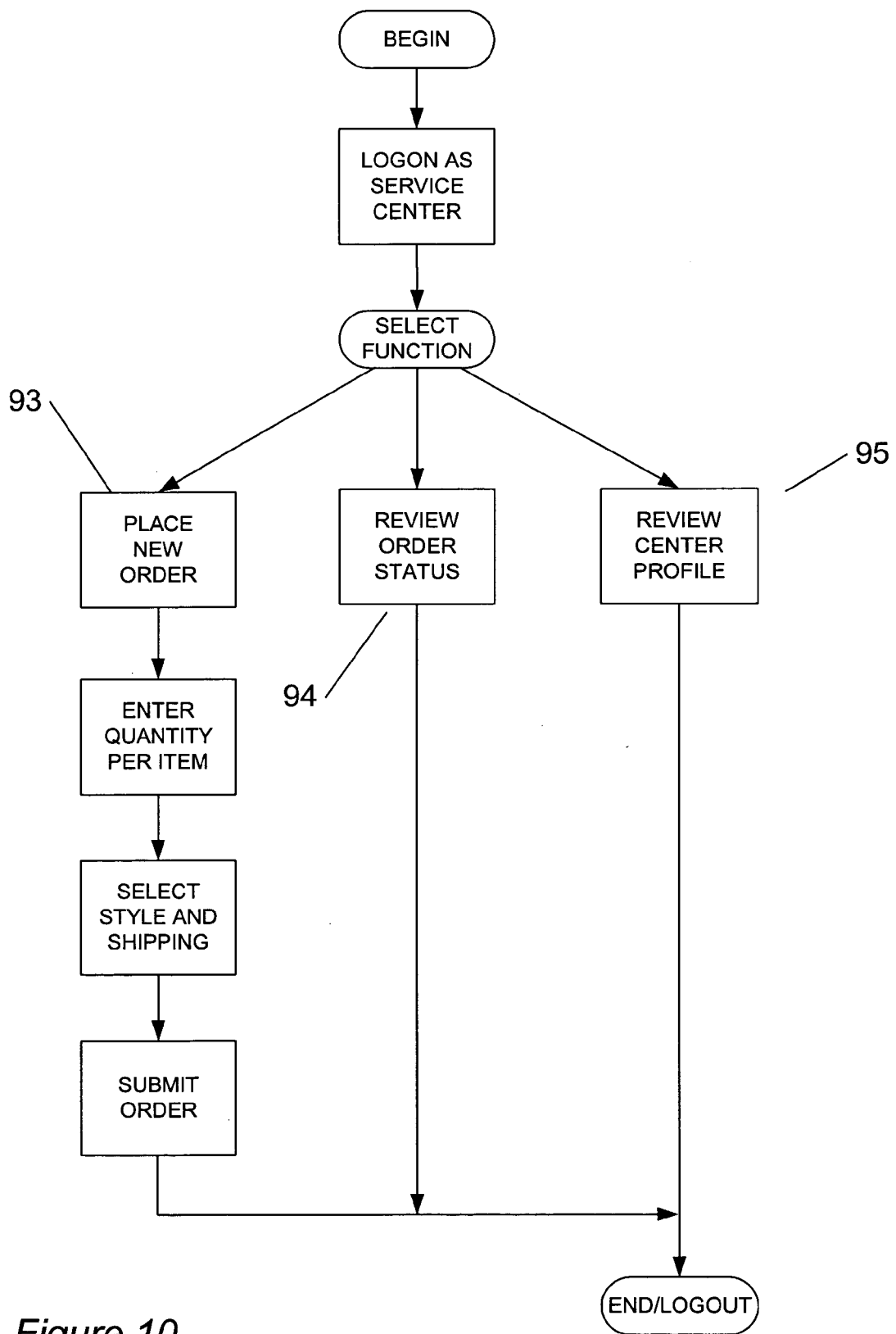
FIG. 10 shows, in flowchart, certain details, from a local office representative requestor's perspective, of the product request entry function of FIG. 2.

As shown in FIG. 10, the local office or service center representative is provided with similar functionality for ordering general stationery or business card products. Although the order placement process 93 and status review functions 94 are virtually identical to those made available to the individual user and the representative may view the local office profile 95, it is noted that the local office level representative does not have the ability to modify the office profile. In this manner, print orders are not disrupted by miscommunication and/or disagreement among remote personnel.

Figure 11:
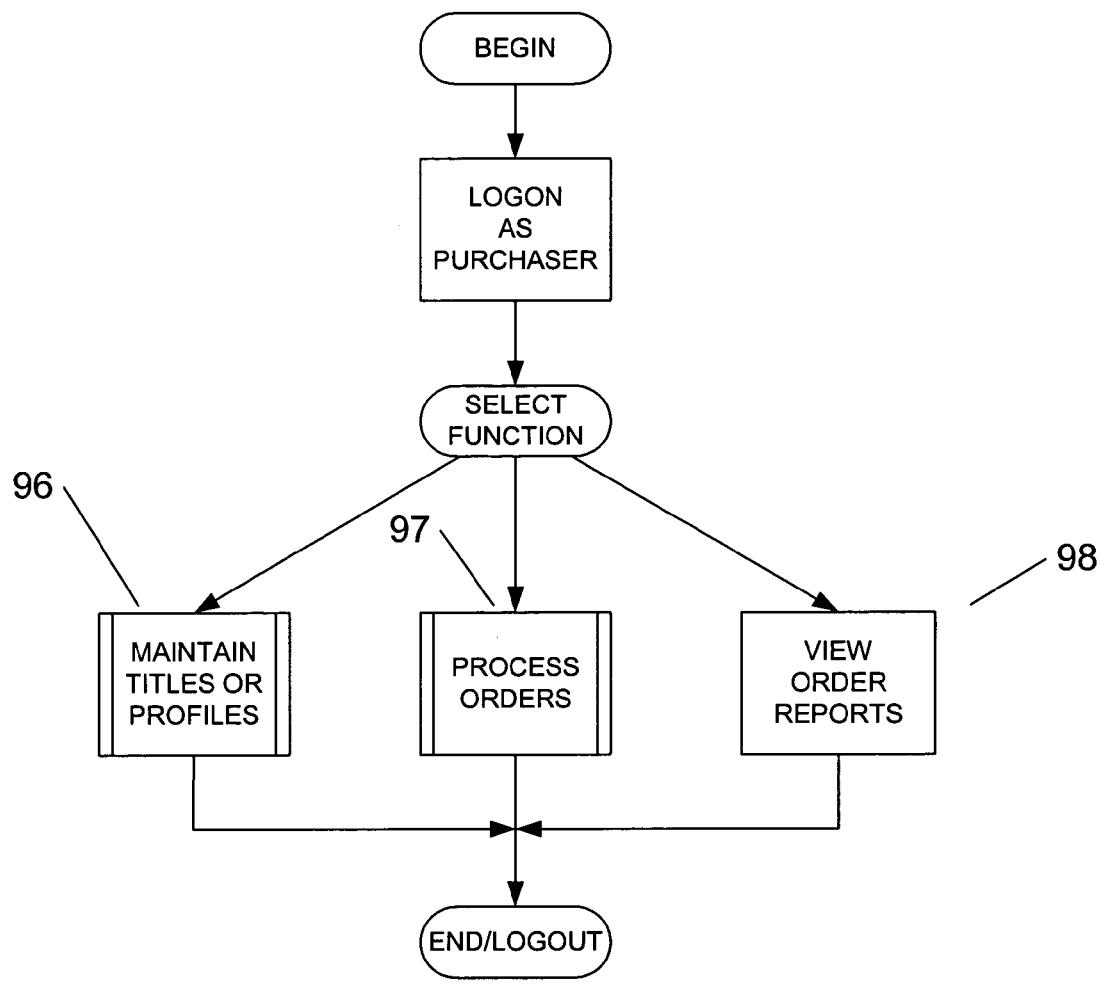
FIG. 11 shows, in flowchart, certain details of the request approval function of FIG. 2.

Turning now to FIG. 11, the company purchasing agent is provided with a purchaser interface 33 through which he or she is able to maintain the local office profiles and/or or the list of authorized personnel titles 96. The purchasing agent is also provided with functionality enabling the expedited modification, deletion and/or approval of individual and service center orders 97 and can at any time view a report indicating the status of all orders in the system 98, from entry through shipment and billing.

Figure 12:
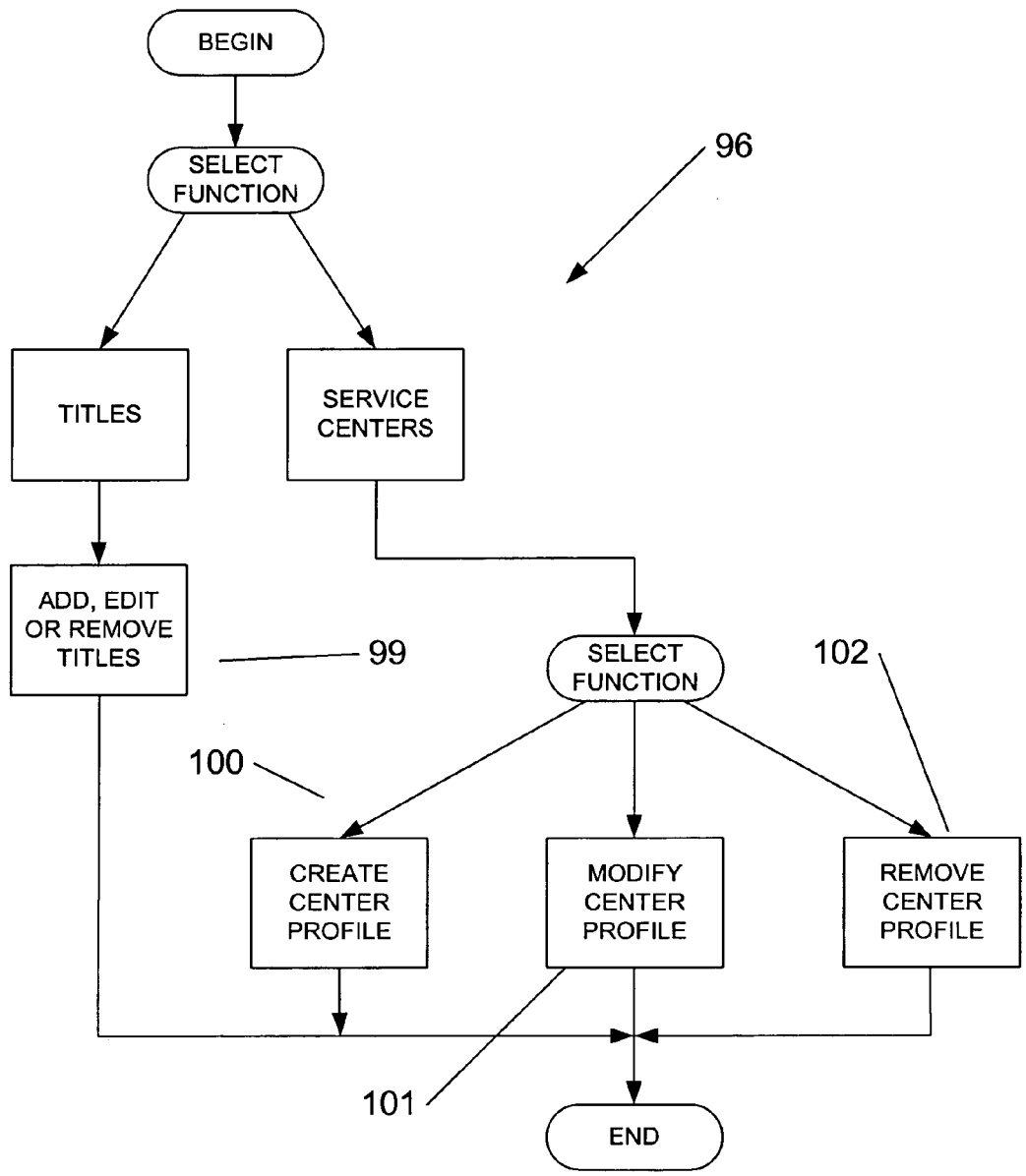
FIG. 12 shows, in flowchart, certain details of the title or profile maintenance step of the request approval function as detailed in FIG. 11.

As shown n FIG. 12, the company purchasing agent is the preferred level of control over the authorized titles list and the content of the service center profiles. The purchasing agent can add, edit or remove titles 99 and can create 100, modify 101 or remove 102 center profiles. Referring back to FIG. 5, however, it is noted that the database 74 is specifically set up to prevent such changes from having an adverse affect on pending orders. For example, it is noted that when a user selects a title 67 from the list of authorized titles, represented in the "titles" table 68, the actual title 67 is imported to the "users" table 64. In this manner, a single keystroke is prevented from upsetting the entire order process. On the other hand, some of the company data, but not necessarily all of the company data, is incorporated into the "users" table 64 by reference only. For example, the service center address 103 may find its way into an order through a reference only in the "users" table 64 indicating the location of the user. In this manner, a center relocation will be reflected upon every affected order not actually printed. Finally, in the event of a center closure during the pending of an order, the order will be rightly cancelled and the individual user will preferably be required to select a new location upon next logon. As shown, in FIG. 13, the service center profile 104 includes much the same types of information as does an individual's profile, including address lines 105, billing codes 106 and/or logo designs 107.

Figure 14:
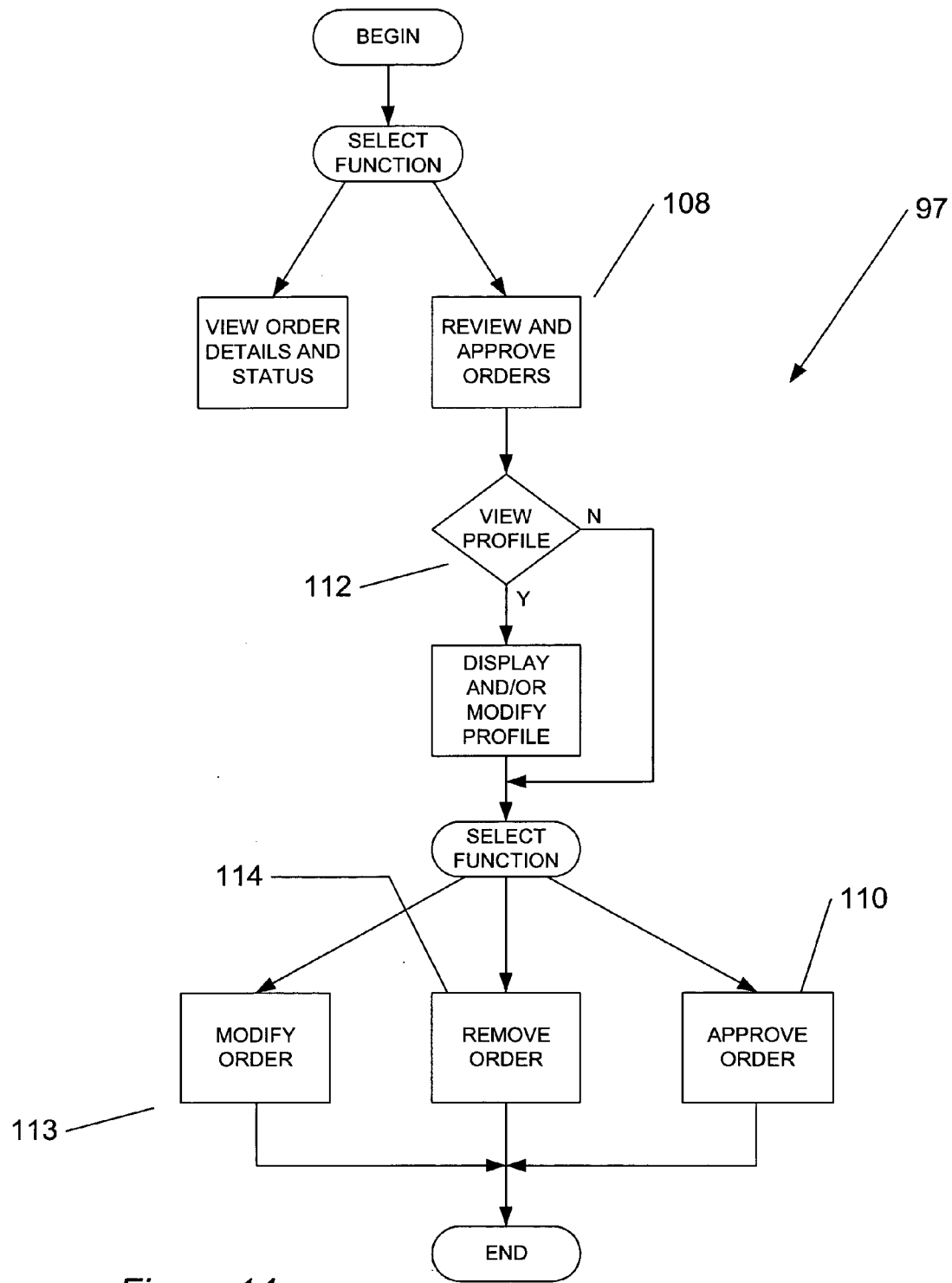
FIG. 14 shows, in flowchart, certain details of the order processing step of the request approval function as detailed in FIG. 11.
Figure 15:
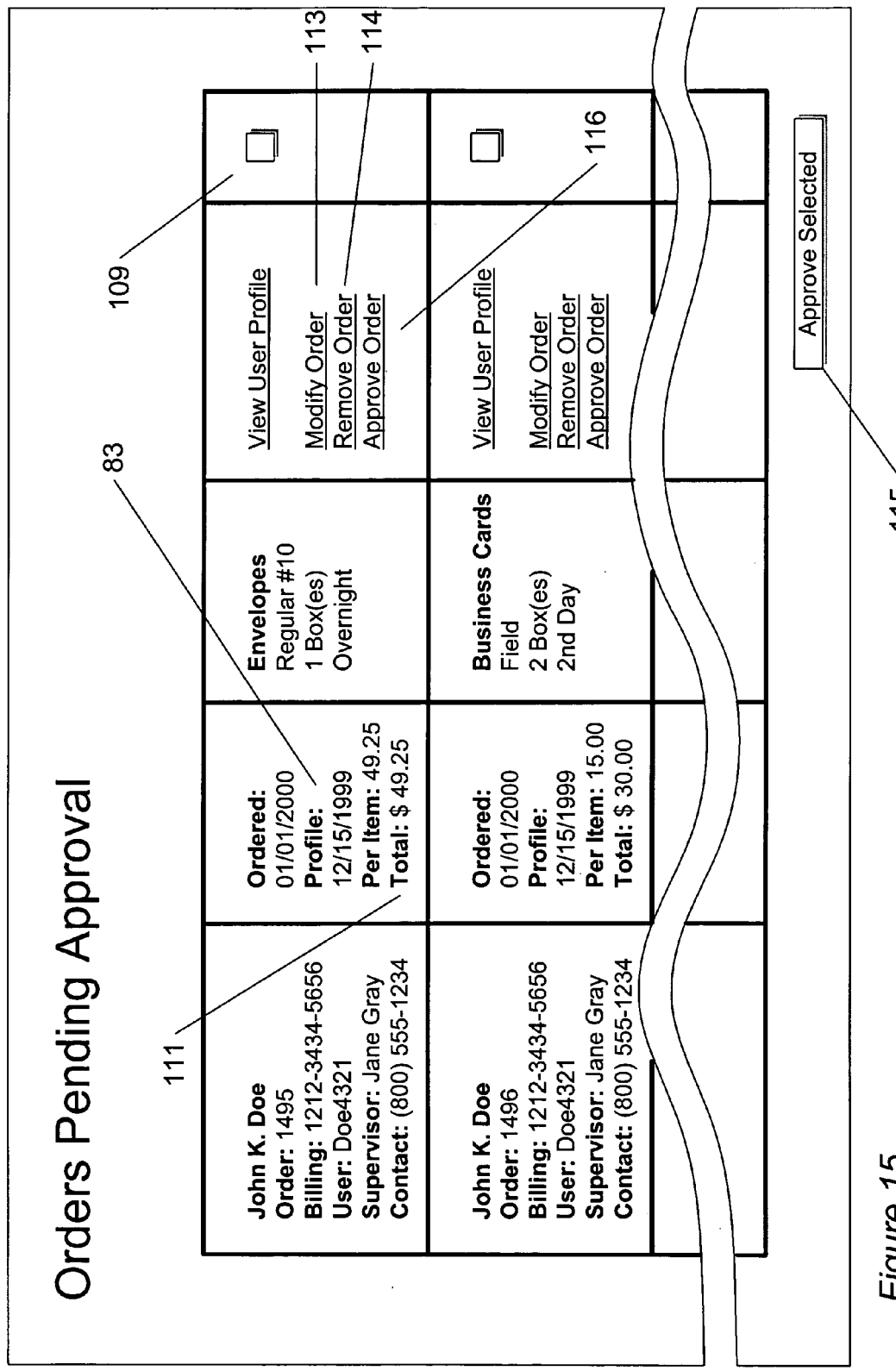
FIG. 15 shows, in a computer screen representation, certain details of the order approval sub-steps of the order processing step as detailed in FIG. 14.

Turning to FIG. 14, the order processing function 97 as made available to the purchasing agent is detailed. As shown, the streamlined process entails reviewing the orders 108 and then simply clicking a check box 109, shown in FIG. 15, to approve the orders 110. As previously mentioned, however, the purchasing agent does have information available indicating when the user last changed his or her profile 83 as well as cost information 111. This information may be used to invoke a decision to view the user's profile 112 for error prevention and/or to modify 113 or remove 114 an order or portion thereof. In the alternative, a feature may be invoked, in all cases or at the discretion of the company client, forcing the purchasing agent to view any new user's profile 112 or any user's profile 112 that has been modified subsequent to the last approved order. In any case, once the purchasing agent has effected all necessary changes and selected those orders for approval, a simple click of the "approve order" button 115 sets the actual printing process into motion. In the alternative, the preferred embodiment also comprises a function for the individual approval of a "rush" order without necessity for setting the entire process in motion 116. In either case, and especially in implementations not comprising a feature forcing the purchasing agent to view any new or changed user's profile 112, the present invention preferably comprises a warning feature that (1) alerts the purchasing agent to the existence of any new or changed user's profile 112 in the approved order and (2) gives the purchasing agent the option to then view any such profile prior to final approval of the order.

In addition to forced viewing of new or changed user's profiles or warnings regarding their existence in an order undergoing approval, a safeguard may be invoked requiring the purchasing agent or the individual or service center user to preview any product resulting from such a profile. While those of ordinary skill in the art will recognize that this feature may be provided without option, the preferred embodiment of the present invention comprises an option, whereby forced previews may by invoked as specified by the company client during initial system setup. For example, a large institutional company may desire only that individual users be forced to preview orders containing new or changed information, thereby ensuring that purchasing agents are not overwhelmed during the approval process. On the other hand, smaller institutional companies or companies with multiple purchasing agents may wish desire that the purchasing agents be forced to preview all orders containing changed information in order to ensure the highest accuracy in the ordering process. Finally, small businesses may wish that this feature not be invoked, leaving the preview to the discretion of the user and/or purchasing agent, who presumably is more aware of new or changed profiles and better prepared to take the appropriate steps to ensure that the order is correct.

Figure 16:
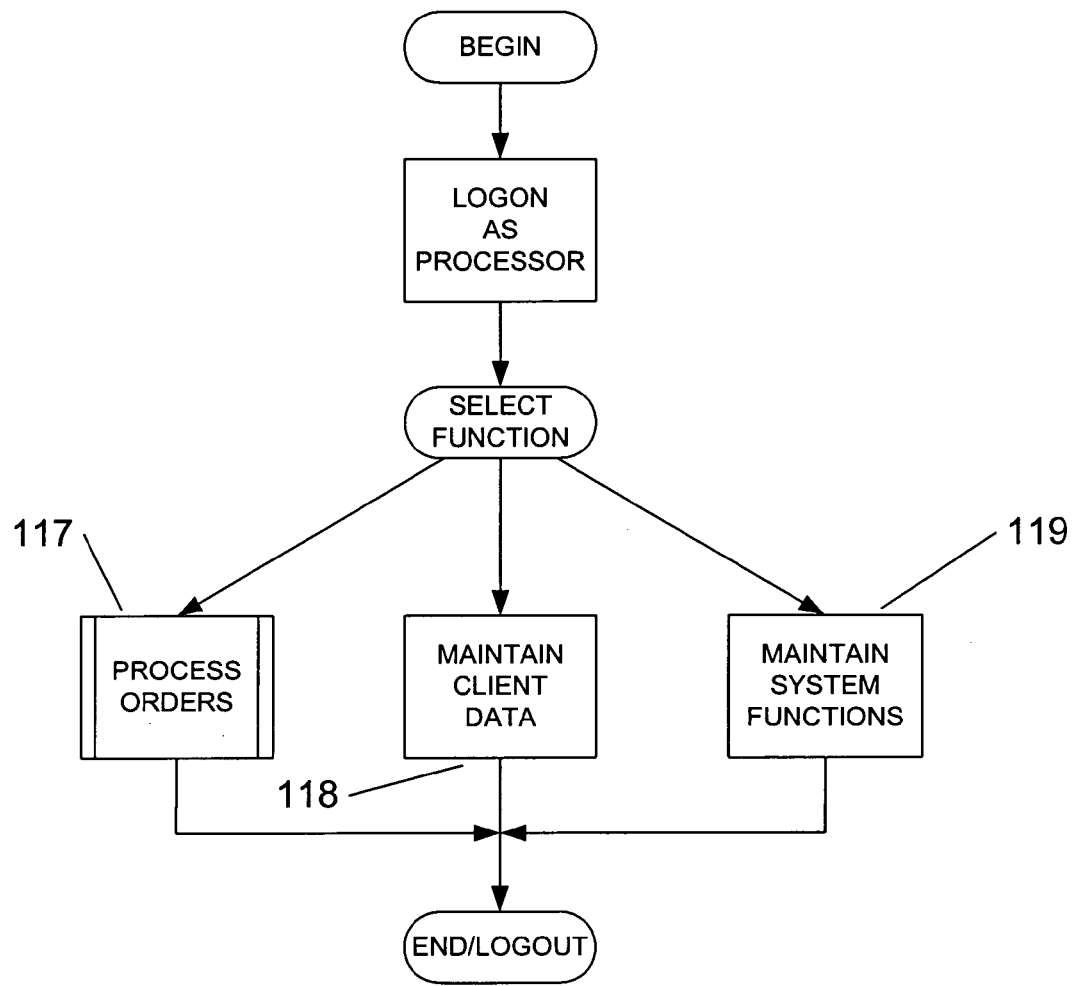
FIG. 16 shows, in flowchart, certain details of the batch processing function of FIG. 2.
Figure 17:
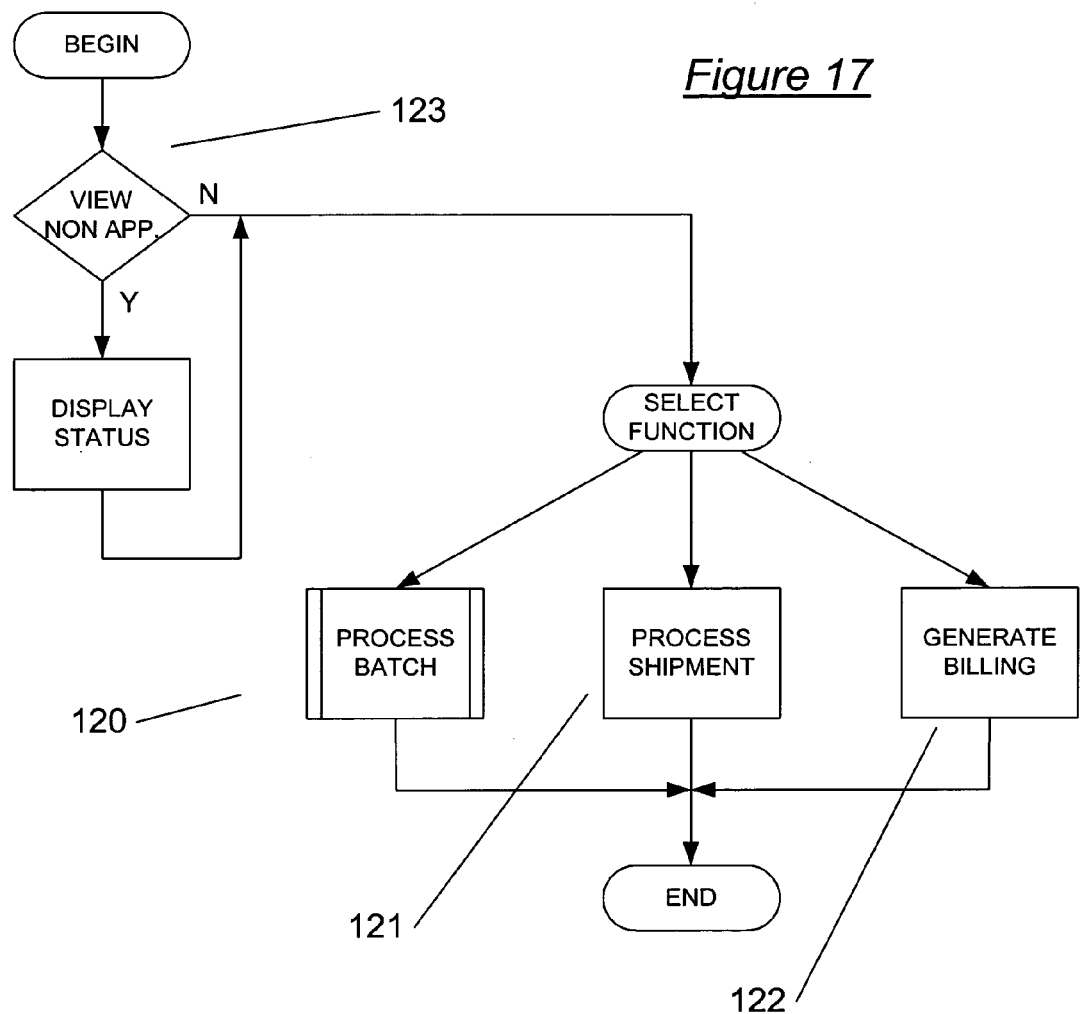
FIG. 17 shows, in flowchart, certain details of the order processing step of the batch processing function as detailed in FIG. 16.

Upon approval of one or more orders, the processor is provided with the ability to process the orders 117, as detailed in FIG. 16. As also detailed in FIG. 16, the processor also always has the ability to maintain client data 118, such a price lists, and to maintain system functions 119, such as the field lists. As shown in FIG. 17, order processing generally comprises the functions of batch processing 120, shipping 121 and billing 122. The processor is, of course, also given the ability to view the status of as of yet not approved orders 123, which is extremely useful for ordering raw materials according to statistical analysis indicating the number of orders that will materialize in the near future.

Figure 18:
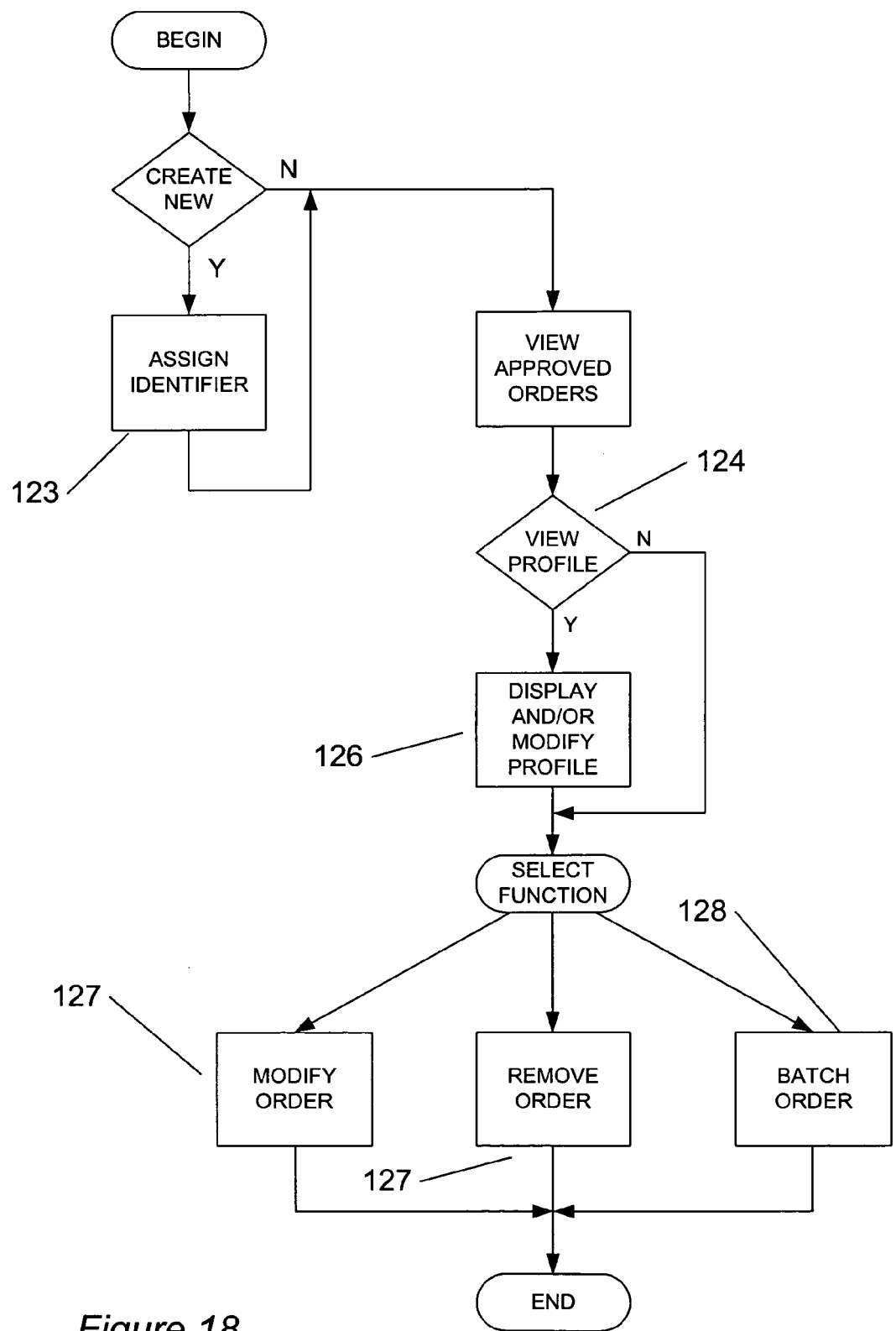
FIG. 18 shows, in flowchart, certain details of the batch creation and implementation sub-step of the order processing step as detailed in FIG. 17.

Batch processing 120, detailed in FIGS. 18 and 19, allows the processor to sort the orders into batches, each of which may be assigned a unique identifier for "work order" purposes 123, and to assign the sorted orders into the appropriate batches 124, the assignment being recorded in a "batch element" table 125 as shown in FIG. 5. The assignment to batches will generally be based upon product style, paper stock requirements and ink color requirements, but also may consider such factors as shipping address. Although this process is presently a manual function, it is anticipated that the entire batching process could be implemented according to a rule-based system. This system would also ensure maximized profit without sacrifice to customer satisfaction by capping the length of time an order may be approved prior to printing while generally attempting to avoid unnecessary print runs. Finally, it is noted that the processor preferably has access to the user profiles 126 as well as the orders themselves 127 during a manual batching, 128 or an intervention to an automated batching, in order that any necessary correction can be made at any time prior to actual printing.

Figure 20:
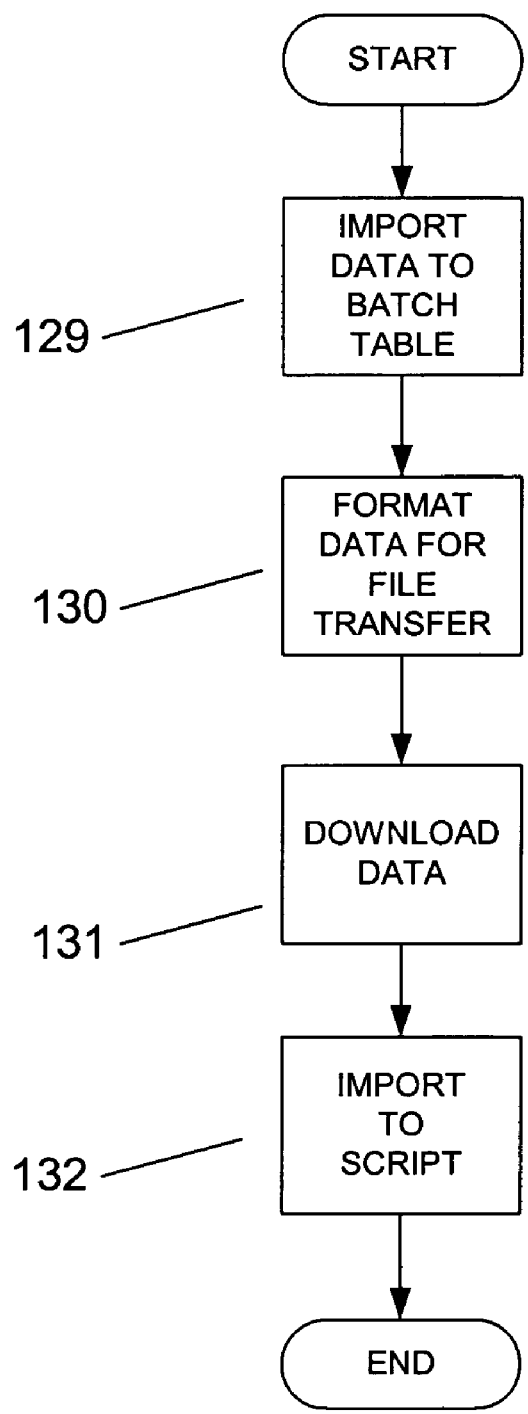
FIG. 20 shows, in flowchart, certain details of the batch-to-script importation function of FIG. 2.

Finally, as shown in FIG. 20, all information necessary for completing an order is flowed into a "batch" table 129 according to the order numbers identified in the "batch element" table 125 at a time just prior to order fulfillment. The data in the "batch" table 129 is then formatted for file transfer 130 and downloaded 131 for importing to the script program 132. In this manner, each predeterminable profile is automatically incorporated into the pre-press product with no typesetting or other human intervention. The pre-press product, which may be a direct-to-plate command set, high-speed copier command set or the like, is then taken to press.

In the system of the present invention, the time for order fulfillment is reduced from several days per plate to three to four minutes. What is more, the errors traditionally associated with business card and stationery product orders are essentially eliminated. It is to be expected, therefore, that the invention of the present invention will find widespread application in the fulfillment of business card and stationery product orders for virtually every institutional and conglomerate user.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. For example, with an implementation involving a Macromedia trademark "FLASH" standard, user instructions could be verbalized and/or animated. In any case, because the scope of the present invention is much broader than any particular embodiment, the foregoing detailed description should not be construed as a limitation of the scope of the present invention, which is limited only by the claims appended hereto.

What is claimed is:

1. A method for automated institutional print order processing that provides different groups of institutional agents with different levels of editorial control over the content of printed products, the method comprising:

defining format-specifying templates for a set of print products for an institution, said format-specifying templates defining the typography and placement of a plurality of graphical and textual elements adapted to be populated with individual-indicative content supplied by user profiles and institution-indicative content supplied by institutional profiles associated with said user profiles;

providing a member of a first group of institutional agents with an Internet accessible requestor interface for selecting and ordering print products;

operating the requestor interface to determine if a user profile has previously been created for said member or if a user profile has not been previously created, creates a user profile for said member;

if a user profile has been previously created
presents said member with selectable options including:
an option to modify the user profile an option to place an order and an option to review an order
where said order is an order for a print product from said set of print products for which said format-specifying templates for said institution have been defined and for which the member is authorized;
generates a previewable representation of the ordered print product that populates the graphical and textual elements of the format-specifying template associated with the ordered print product with individual-indicative content extracted from the user profile of the member of the first group and institution-indicative content extracted from an associated institutional profile;

maintaining audit information related to said user profile, said audit information sufficient to identify the date the addition or modification was made, what was added or modified, and who made the addition or modification;

providing a second group of institutional agents with an Internet accessible purchaser interface operating the purchaser interface by a member of said second group to define and modify institutional profiles to provide institution-indicative content for the format-specifying templates;

requiring a member of the second group to view the previewable presentation of the print product order by the user prior to processing the print order request.

2. The method of claim 1, wherein the requestor interface allows the member of the first group to select a title from a list of selectable authorized personnel titles wherein the selected title will be associated with the user profile of the member of the first group.

3. The method of claim 2, wherein the purchaser interface further allows the member of the second group to define the list of selectable authorized personnel titles provided to a requestor interface user.

4. The method of claim 2, wherein the Internet accessible purchaser interface further allows the member of the second group to view the audit record and allows the member of the second group to modify or delete both user profiles and print orders.

* * * * *